United States Patent

Tossman et al.

[15] 3,637,169
[45] Jan. 25, 1972

[54] VARIABLE PARAMETER NUTATION DAMPER

[72] Inventors: Barry E. Tossman; Frederick F. Mobley; Robert E. Fischell, all of Silver Spring, Md.

[73] Assignee: The United States of America as represented by the Secretary of the Navy

[22] Filed: Aug. 8, 1969

[21] Appl. No.: 848,503

[52] U.S. Cl. ........................244/1 SA, 74/55, 188/1 B, 310/93
[51] Int. Cl. ........................................B64g 1/00
[58] Field of Search ..................244/1 SS, 1 SA; 310/93, 105; 188/1 B; 74/5.5

[56] References Cited

UNITED STATES PATENTS

| 3,249,321 | 5/1966 | Newkirk et al. | 244/1 SS |
| 3,277,486 | 10/1966 | Kuebler | 244/1 SS X |
| 3,282,532 | 11/1966 | Tinling et al. | 244/1 SS |
| 3,363,856 | 1/1968 | Tossman et al. | 244/1 SS |
| 3,426,980 | 2/1969 | Caggiano et al. | 244/1 SS |
| 3,510,705 | 5/1970 | O'Neill et al. | 244/1 SS X |

FOREIGN PATENTS OR APPLICATIONS

| 1,164,557 | 3/1964 | Germany | 310/93 |

*Primary Examiner*—Milton Buchler
*Assistant Examiner*—Jeffrey L. Forman
*Attorney*—R. S. Sciascia and J. A. Cooke

[57] ABSTRACT

An end-weighted pendulum is suspended on a torsion wire which extends parallel to the spin axis of a spacecraft and restrains the pendulum to swing in a plane normal to the spin axis, if the spacecraft is nutating. The end of the pendulum is a vane member formed of electrically conductive, nonmagnetic material which swings between the pole faces of a magnetic structure and creates eddy-current losses within the vane member to dissipate the nutation energy. Means are provided for changing both the eddy-current damping coefficient and the mechanical resonance of the nutation damper structure so that the damper is effective in dissipating nutations at more than one spacecraft spin rate.

5 Claims, 3 Drawing Figures

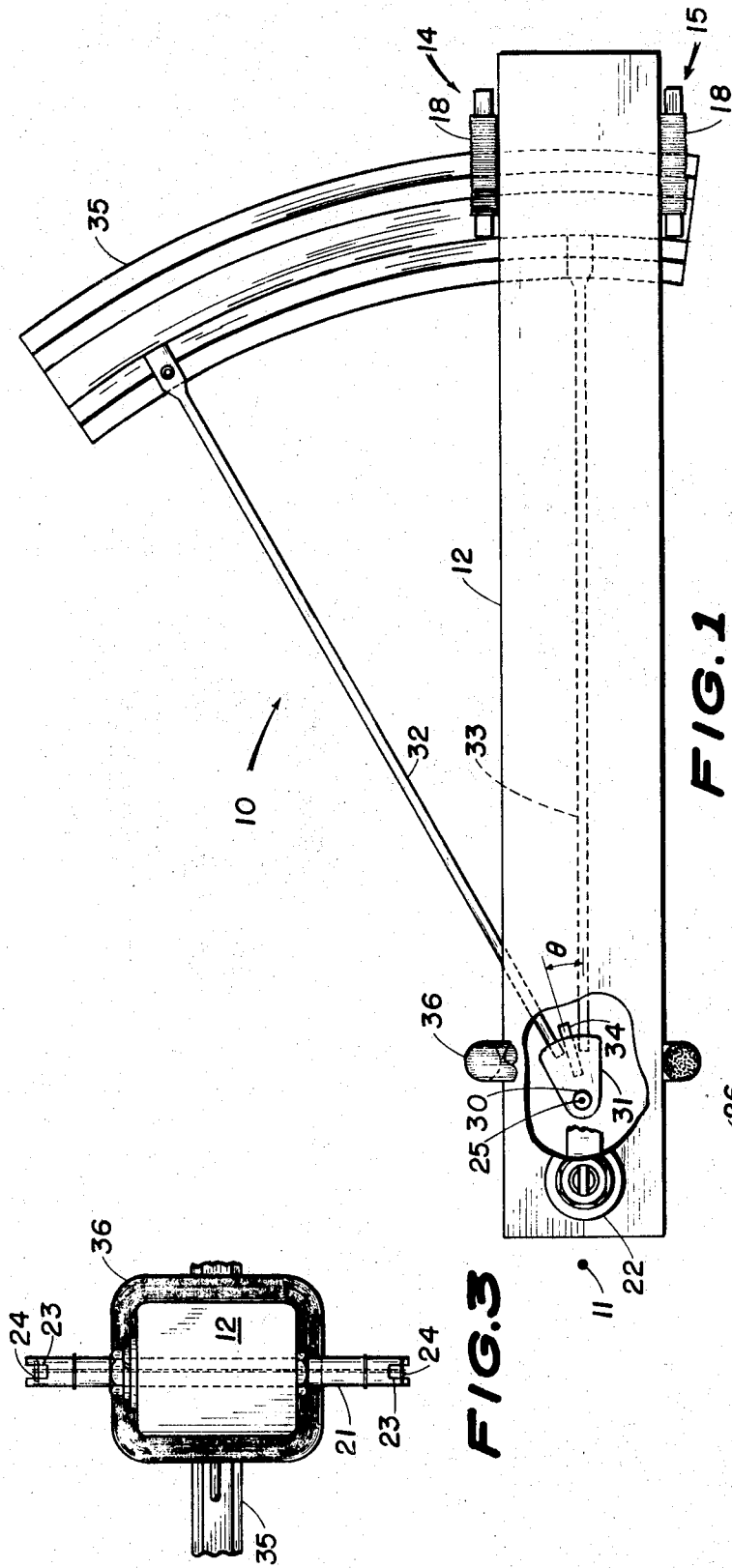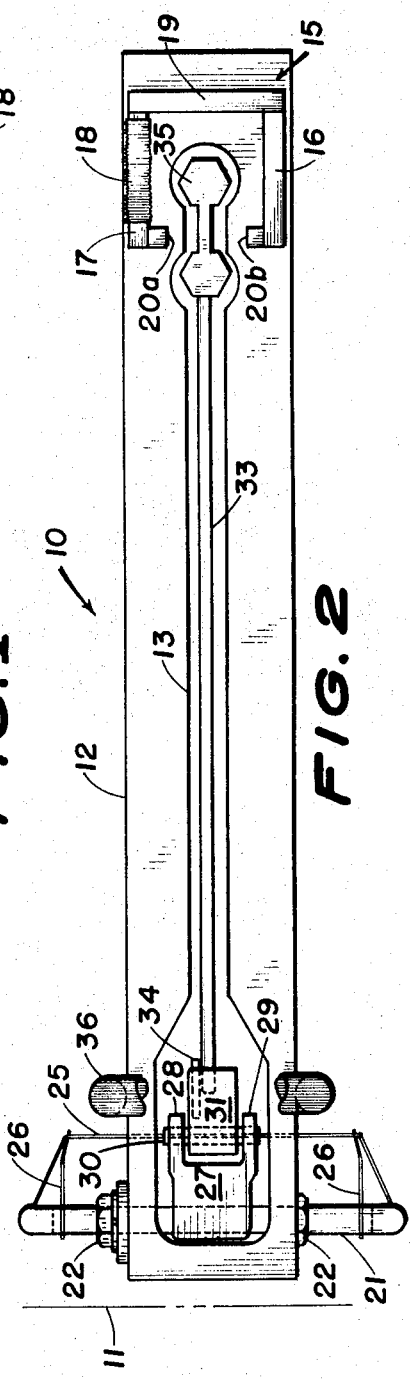
INVENTORS
BARRY E. TOSSMAN
FREDERICK F. MOBLEY
ROBERT E. FISCHELL

VARIABLE PARAMETER NUTATION DAMPER

BACKGROUND OF THE INVENTION

It is well known that spin-stabilized spacecraft inherently undergo undesirable nutations or wobbling when placed in orbit. In order to insure optimum spacecraft performance in space, it is normally desirable to dissipate the nutational energy so that the spacecraft's attitude will remain substantially constant, with the spin axis stabilized. Various types of nutation damper structures have been heretofore proposed for the purpose of dissipating the nutational energy of a spin-stabilized spacecraft. However, such prior art damper structures are normally effective at only one spin rate and, moreover, often fail to afford effective nutation damping at relatively low spacecraft spin rates.

SUMMARY OF THE INVENTION

The nutation damper structure of the present invention overcomes the above-mentioned deficiencies in the previously proposed nutation dampers in that it effectively damps out spacecraft nutations at even very low spacecraft spin rates and its eddy-current damping coefficient and mechanical resonance are variable so that the proposed damper structure is effective at more than a single spin rate or angular momentum state.

More specifically, the proposed nutation damper structure includes an end-weighted pendulum which is suspended on a torsion wire that extends parallel to, but offset from, the intended spin axis of the spacecraft so that the pendulum swings in a plane normal to the spin axis when the satellite is nutating about the spin axis. The pendulum end mass is a vane of electrically conductive, nonmagnetic material which swings between the pole faces of a magnetic structure and thereby creates eddy-current losses within the vane member to dissipate the nutational energy. The eddy-current damping coefficient between the magnetic structure and the vane member is variable. Moreover, the torsion constant for the torsion wire assembly; i.e., the damper's mechanical resonance, is also variable. Consequently, the damper structure will effectively dissipate the nutational energy, within a reasonable time interval, at more than one satellite nutational frequency.

In view of the above, one object of the present invention is to provide an improved nutation damper structure for spacecraft.

Another object of the present invention is to provide a spacecraft nutation damper structure whose operational parameters are variable so as to enable the damper structure to effectively damp out spacecraft nutations at more than one spacecraft nutational frequency.

Another object of the present invention is to provide an improved eddy-current-type nutation damper structure for spin-stabilized spacecraft whose eddy-current-damping coefficient and mechanical resonance are both variable.

Other objects, purposes and characteristic features of the present invention will in part be pointed out as the description of the present invention progresses and in part be obvious from the accompanying drawings, wherein:

FIG. 1 is a top view of an eddy-current nutation damper structure constituting one embodiment of the present invention, with a portion broken away to show the torsion wire assembly employed therein;

FIG. 2 is a side view of the nutation damper structure of FIG. 1; and

FIG. 3 is an end view of the damper structure of FIGS. 1 and 2, as seen from the left-hand end of the damper structure.

DESCRIPTION OF THE PREFERRED EMBODIMENT

Referring now to the drawings, the proposed eddy-current nutation damper of the present invention is generally illustrated at 10 and is adapted to be mounted in a plane normal to the desired spin axis 11 of the spacecraft, as shown in FIGS. 1 and 2. The damper structure includes an elongated housing member 12 which supports the operating mechanism of the proposed damper structure and, moreover, enables the structure to be suitably mounted in the satellite. As most clearly shown in FIG. 2, the sides of the nutation damper housing member 12 are each provided with an elongated slot 13 to permit swinging movement of the movable portion of the nutation damper, as will be described hereinafter.

Secured adjacent the right-hand or outer end of the housing member 12 are magnetic structures 14 and 15. More specifically and with reference to FIG. 2 of the drawings, each magnetic structure 14 and 15 includes a permanently magnetized core portion 16 made, for example, of Alnico V and a chargeable core portion 17, also constructed of Alnico V and supporting an energizable coil 18 adapted to produce a magnetic field which either aids or opposes that produced by the permanently magnetized core portion 16. A third core portion 19 interconnects the core portions 16 and 17. The permanently magnetized core portion 16 and the chargeable core portion 17 function to produce a resultant magnetic field across the pole faces 20a and 20b of the overall magnetic structure 14 or 15.

Referring now to the left-hand or inboard end of the damper structure 10, a support post 21 extends through the housing member 12 and is held in place by suitable nuts and washers 22. As shown most clearly in FIG. 3 of the drawings, the support post 21 is formed with a notch 23 at each of its extending ends to receive small pins 24. Secured to pins 24 are the opposite ends of a torsion wire 25 which, for example, may be formed of a 10 percent nickel/platinum ribbon of the type used in taut-band meter movements. As shown in FIG. 2, the torsion wire 25 extends through the housing member 12 and is maintained in spaced, parallel relationship with the post 21 and spin axis 11 by a pair of spring fingers 26 secured to the post 21.

Secured at the center of the support post 21 and within the housing member 12 is a pivot support bracket 27 formed with extending arm portions 28 and 29. These extending arms 28 and 29 are formed with suitable holes (not shown) adapted to loosely receive cylindrical member 30 which is secured to the center of torsion wire 25. The cylindrical member 30 is free to rotate within the extending arm portions 28 and 29 of support bracket 27. Affixed to the cylindrical member 30 is a wedge-shaped block of nonmagnetic material 31 adapted to receive a pair of damper vane support arms 32 and 33. Also secured to the block 31 is a bar-shaped permanent magnet 34 extending midway between the support arms 32 and 33, as shown in FIG. 1.

Secured at the extending or right-hand ends of the support arms 32 and 33 is a vane member 35 constructed of electrically conductive, nonmagnetic material such as copper, for example. As shown most clearly in FIG. 2, the vane member 35 is disposed with its center aligned between the pole faces 20a and 20b of the magnetic structures 14 and 15 and, as previously mentioned, vane member 35 is restrained by torsion wire 25 to swing in a plane normal to the spacecraft spin axis 11 during spacecraft nutations. Consequently, movement of the vane member 35 relative to the magnetic structures 14 and 15, during such nutations of the spacecraft about its spin axis 11, will create eddy-currents within the vane member 35 to dissipate the nutational energy of the spacecraft and thereby stabilize it about the spin axis 11. When spin axis stability is achieved, the vane member 35 remains motionless with permanent magnet 34 aligned with the longitudinal centerline of the housing member 12.

Referring once again to the left-hand or pivot end of the nutation damper 10, a field coil 36 is disposed about the housing member 12, as most clearly shown in FIG. 3, so as to be substantially aligned vertically with the permanent magnet 34, for reasons to be described hereinafter. The field coil 36 is adapted to be energized from a constant current source (not shown).

As mentioned previously, the nutation damper of the present invention is capable of effectively dissipating the nutational energy of the spacecraft, so as to stabilize it about the spin axis 11, at more than one spacecraft nutational frequency. More specifically and as is well-known to those skilled in the art of satellite attitude control, the nutation frequency, $\omega_n$, of a spacecraft is a function of the angular momentum of the satellite and the moment of inertia. The nutation damper is most effective when tuned to the nutation frequency $\omega_n$ which constitutes the driving frequency for the damper structure. For such a condition to exist, the so-called torsion constant, $k_t$, of the torsion wire assembly should be:

$$k_t = I_{damper} \times \omega_n^2$$

where $I_{damper}$ = damper moment of inertia. This torsion constant $k_t$ is the sum of the spring constant for the torsion wire 21 and the effective spring constant produced by the magnet 34, in combination with the field coil 36. In one practical embodiment of the present invention, for use aboard a satellite at a spin rate of one-twelfth r.p.m. or 0.00873 radians per second, with a stabilizing rotor and with an $I_{damper}$ of $1 \times 10^5$ gm.-cm.², the torsion wire assembly has a torsion constant, $k_t$, of 647 dyne-cm./rad. The torsion wire 21 to achieve this value of $k_t$ consists of a nickel/platinum ribbon having a 0.0163 by 0.00163-inch cross section, with each leg of the torsion wire 0.86 inches long.

In the aforementioned practical application of the illustrated eddy-current nutation damper structure, the eddy-current damping coefficient, $C_{damper}$, required to achieve the fastest nutation damping time constant is 1,000 dyne-cm. seconds and is produced by energizing the coil 18 in the magnetic structures 14 and 15 such that they oppose the magnetic field established across the pole faces 20a and 20b by the permanently magnetized portions 16 of the structures 14 and 15. In this operating mode, the nutation damper mechanical resonance matches the spacecraft nutation frequency $\omega_n$.

If the angular momentum of the spacecraft is reduced, for example by shut down of the stabilizing rotor, a corresponding change in the nutation frequency, $\omega_n$, occurs and is then far removed from the natural resonance of the damper structure 10 and with no change in torsion modulus of the torsion wire assembly or the damping coefficient between the vane 35 and the magnetic structures 14 and 15, the nutation damping time constant would be exceedingly long. Consequently, in order to provide spin-stabilization at such low nutational frequencies, both mechanical resonance and eddy-current damping coefficient must be changed.

More specifically, the torsion constant $k_t$, of the torsion wire assembly is effectively reduced by energizing the field coil 36 to produce a magnetic field directed along the damper symmetry axis (equilibrium position for the weight 35) in such a direction that it opposes the dipole moment sense for the permanent magnet 34. As a typical example, the permanent magnet 34 might produce a dipole moment strength of 20 pole-cm.; whereas, the parameter change torque coil 36 produces a 23 gauss field from a constant current energization. For small amplitude of damper motion, the magnetic torque produced by the interaction of magnet 34 and field coil 36 acts as a positive spring constant which negates the torsion wire spring constant and thereby allows the damper structure to respond to the reduced nutational frequency; i.e., the damper mechanical resonance is tuned to the new nutation frequency. The above-described torque constant parameter change mechanism is inherently stabilizing since, for larger amplitudes of damper motion, the magnetic torque produced by the interaction of magnet 34 and coil 36 varies as $k_t \sin \theta$, while the spring torque of torsion wire 21 is equal to $-k_t \theta$; where $\theta$ is the angular displacement (see FIG. 1) between the permanent magnet 34 and the centerline of the overall damper structure. The net effect is that at small amplitudes of $\theta$, the effective restraining torque is zero, while at larger amplitudes, the torsion wire spring dominates and tends to stabilize the weighted pendulum formed by arms 32 and 33 and vane member 35.

For this decreased angular momentum mode, the eddy-current damping coefficient, $C_{damper}$, is also increased by energizing the coils 18 on magnetic structures 14 and 15, so as to increase the magnetic flux produced across the pole faces 20a and 20b and thereby also cause more eddy-current generation within the copper vane 35. For example, in one practical application of the proposed damper structure, a magnetic flux increase from 1,000 to 8,000 dyne-cm.-sec. was achieved. By employing the parameter change mechanism just described, the nutation damping time constant was effectively reduced to more acceptable limits.

Having thus described one particular embodiment of the present invention, it should be understood at this time that various modifications, adaptations and alterations of the illustrated embodiment are of course possible without departing from the spirit and scope of the appended claims.

What is claimed is:

1. A nutation damper for a spin-stabilized spacecraft comprising,
   a torsion wire assembly including a torsion wire extending parallel to and offset from the spin axis of said spacecraft,
   an arcuate vane member constructed on nonmagnetic, electrically conductive material supported by said torsion wire assembly and adapted to swing in a plane normal to said spin axis during nutations of said spacecraft,
   a magnetic structure including a pair of pole faces between which said vane member swings during nutations of said spacecraft and means for producing a magnetic field across said pole faces, and
   means for varying the torsion constant of said torsion wire assembly.

2. The nutation damper specified in claim 1 wherein said means for varying the torsion constant of said torsion wire assembly comprises,
   a permanent magnet mounted on said torsion wire assembly adjacent said torsion wire to swing during nutations or said spacecraft, and
   an energizable coil mounted adjacent permanent magnet for producing a magnetic field directed opposite to the dipole moment sense of said permanent magnet.

3. The nutation damper specified in claim 1 wherein said means for producing a magnetic field across said pole faces is capable of producing a variable magnetic field so as to vary the damping coefficient between said pole faces and said vane member.

4. The nutation damper specified in claim 3 wherein said variable magnetic field-producing means includes a permanent magnet for producing a magnetic field across said pole faces and an electromagnet adapted to be energized so as to increase and decrease the magnetic field produced across said pole faces by said permanent magnet.

5. The nutation damper specified in claim 4 wherein said magnet structure comprises a substantially C-shaped magnetic core structure, one portion of said C-shaped magnetic core structure being permanently magnetized, and another portion of said C-shaped magnetic core structure being provided with a winding adapted to be selectively energized to add to and oppose the magnetic field produced by said permanently magnetized portion.

* * * * *